United States Patent
Jansen et al.

[11] Patent Number: 6,050,081
[45] Date of Patent: *Apr. 18, 2000

[54] AIR PURGING FUEL VALVE FOR TURBINE ENGINE

[76] Inventors: Harvey B. Jansen, 8135 E. Culver St., Mesa, Ariz. 85207; Kevin W. Deutscher, 3704 E. Ahwatukee Dr., Phoenix, Ariz. 85044

[*] Notice: This patent issued on a continued prosecution application filed under 37 CFR 1.53(d), and is subject to the twenty year patent term provisions of 35 U.S.C. 154(a)(2).

[21] Appl. No.: 09/022,421

[22] Filed: Feb. 12, 1998

Related U.S. Application Data
[60] Provisional application No. 60/037,977, Feb. 12, 1997.
[51] Int. Cl.⁷ .................................................. F02C 7/232
[52] U.S. Cl. ........................................ 60/39.094; 137/112
[58] Field of Search .............................. 60/39.094, 734; 137/112, 114, 625.4, 627.5, 630.16

[56] References Cited

U.S. PATENT DOCUMENTS

| | | | |
|---|---|---|---|
| 3,038,487 | 6/1962 | Gardner | 137/112 |
| 3,338,257 | 8/1967 | Ferguson | 137/112 |
| 3,632,080 | 1/1972 | King | 251/30 |
| 3,703,185 | 11/1972 | Usry | 137/82 |
| 4,041,695 | 8/1977 | Harper et al. | 60/39.094 |
| 4,095,418 | 6/1978 | Mansson et al. | 60/39.094 |
| 4,222,405 | 9/1980 | Rosenblad | 137/216.1 |
| 4,359,929 | 11/1982 | Stearns | 91/47 |
| 4,467,957 | 8/1984 | Bucheit | 236/96 |
| 4,531,587 | 7/1985 | Fineberg | 166/332 |
| 4,687,055 | 8/1987 | Leggett | 166/72 |
| 5,346,175 | 9/1994 | Hunnicutt | 251/129 |
| 5,391,055 | 2/1995 | Carvalho | 416/157 |

*Primary Examiner*—Louis J. Casaregola
*Attorney, Agent, or Firm*—Quarles & Brady LLP

[57] ABSTRACT

An air purge/fuel valve for a turbine engine uses a spool configuration to provide both a more reliable check valve system preventing backflow into the fuel line or the air purge line and a mechanically positive prevention of simultaneous gas and air flow, together with the features of a pneumatically actuated valve in which an external pneumatic actuator positively moves the valve spool against possible resistance of the spool caused by minor coking.

5 Claims, 2 Drawing Sheets

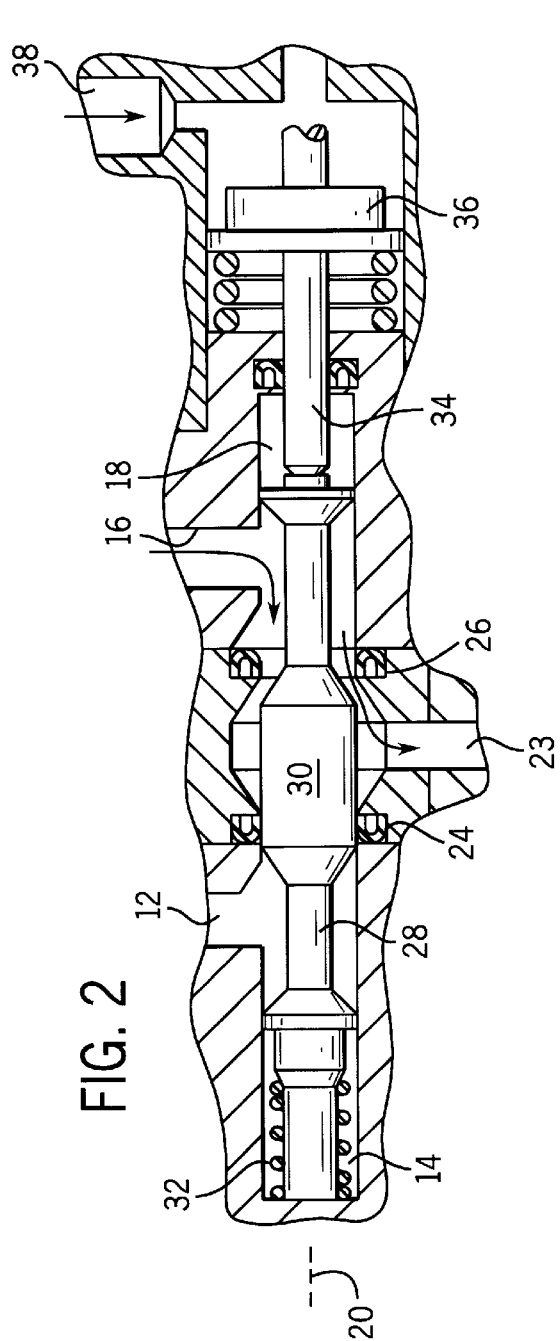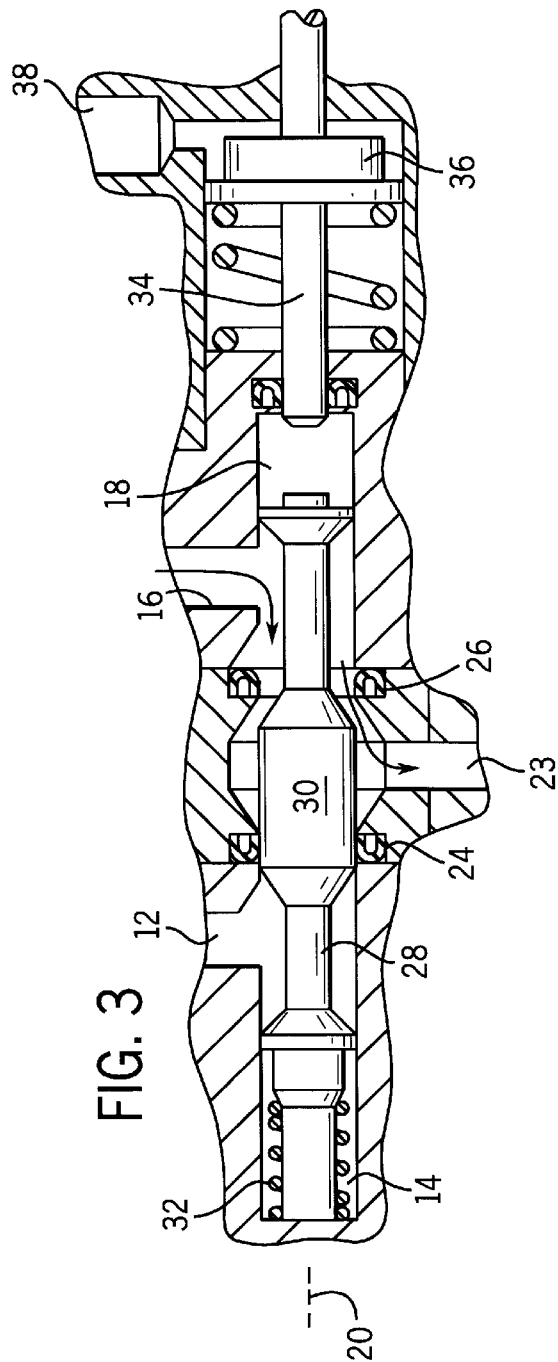

AIR PURGING FUEL VALVE FOR TURBINE ENGINE

CROSS-REFERENCE TO RELATED APPLICATIONS

This application hereby claims the benefit of provisional application No. 60/037,977 filed Feb. 12, 1997.

BACKGROUND OF THE INVENTION

Gas turbine engines employ a set of rotating turbine blades to compress air leading to a combustion chamber into which fuel is injected and ignited. The hot gases from combustion turn a downstream set of blades from which energy is extracted and which are also typically connected to a common shaft to turn the compressor blades.

Fuel is delivered to metering orifices in the combustion chamber under pressure through a fuel line. When the engine is to be shut down, the fuel pump supplying fuel is turned off, a fuel line valve closed, and the fuel line purged with hot gases from the turbine compressors. The purging prevents fuel from "coking" at the metering orifice. In coking, the volatile components of the fuel are driven off leaving only a tarry deposit.

In order to permit purging of the fuel line, a purging air line must join with the fuel line. Because it is important that fuel not go down the air purge line and that hot gases not travel up the fuel line to its source, typically check valves are installed in each of these lines. Such check valves may employ a spring-loaded valve member that closes when the pressure drop across the valve member drops to zero or reverses. In this application, such valves may be unreliable, sticking in the open position as a result of debris or the like. Further, there is inevitably some backwash through the valves as they close, letting hot gases into the fuel line or fuel into the hot gas purge line with the result that coking fuel coats the check valve mechanism further reducing its reliability.

The fuel cut-off valve may be controlled by a pneumatic actuator operating a valve in line with the check valve of the fuel line. Such a valve is also subject to coking and may introduce substantial pressure drops in the fuel flow. The fuel cut-off valve introduces a potential failure point to the turbine where, if pressure is lost to the pneumatic actuator, the turbine will cease operating.

What is needed is a mechanism for air purging and fuel control, preventing backwash, more resistant to coking, yet more reliable than provided by conventional cutoff valve check combinations.

BRIEF SUMMARY OF THE INVENTION

The present inventors have recognized that a single free moving spool valve in conjunction with a pneumatic actuator can provide for both the function of the check valve and the fuel cut off valve while avoiding the shortcoming inherent in these separate devices.

Specifically, the present invention provides a purging fuel valve for a turbine engine having lines providing pressurized fuel, pressurized hot purge air from the engine, and having a fuel line leading to a combustion area of the engine. The valve includes a first annular seal dividing an air chamber receiving the source of pressurized hot air from an outlet chamber communicating with the fuel line, and a second annular seal positioned in opposition along a spool axis from the first annular seal and dividing the outlet chamber from a fuel chamber receiving the source of pressurized fuel. A spool extends along the spool axis to move therealong, the spool having a center section closing the first annular seal while allowing fuel flow through the second annular seal at a first position along the spool axis and closing the second annular seal while allowing hot purging air through the first annular seal at a second position along the spool axis, and closing both the first and second annular seals at a third position between the first and second positions.

Thus, it is one object of the invention to provide a valve that reduces coking. The spool, by its design, must block either the air or the fuel line preventing any possibility of a direct conduit between the two as might allow backflow of fuel or air.

The valve may include stops within the fuel and air chambers and wherein the spool contacts a respective stop at the first and second positions to limit further motion of the spool and wherein the spool is freely movable in response to pressure on the spool from the hot purge air and pressurized fuel.

Thus, it is one object of the invention to eliminate the need for separate check valves. The spool itself provides for a check valve operation when driven by the pressures of the purge line or the fuel line.

The valve may further include an actuator cylinder having a shaft extending along the spool axis from the fuel chamber to bias the spool toward the first position when the actuator cylinder is actuated.

It is thus another object of the invention to permit the use of a separate pneumatic actuator to initiate fuel flow, yet to allow the pressure of the fuel itself to sustain fuel flow in the event of actuator failure.

The foregoing and other objects and advantages of the invention will appear from the following description. In this description, references are made to the accompanying drawings which form a part hereof, and in which there are shown by way of illustration, the preferred embodiment of the invention. Such embodiment does not necessarily represent the full scope of the invention, however, and reference must be made to the claim herein for interpreting the scope of the invention.

BRIEF DESCRIPTION OF THE SEVERAL VIEWS OF THE DRAWINGS

FIG. 2 is a fragmentary view similar to that of FIG. 1 showing the spool in position for fuel flow as moved by the pneumatic actuator; and FIG. 3 is a fragmentary view similar to that of FIG. 1 showing the spool in position for fuel flow after failure of the pneumatic actuator.

DETAILED DESCRIPTION OF THE INVENTION

Figure 1:
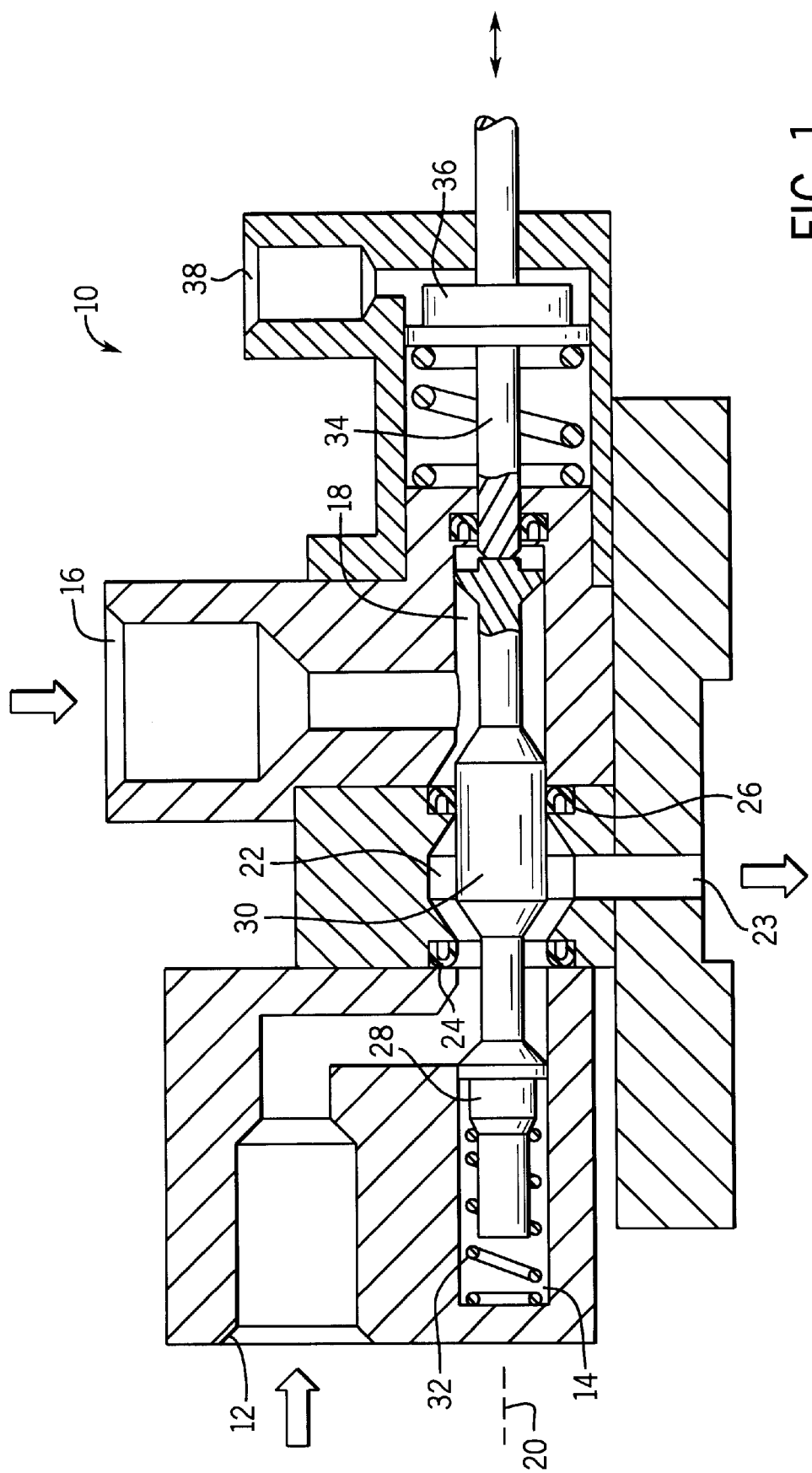
FIG. 1 is a cross-sectional view through the valve assembly of the present invention showing the inlets of purge air, fuel, actuator air, and an outlet to the combustor, and showing a spool movable to block opposed seals separating a common chamber from the inlet of purge air and the inlet of fuel, the spool being in the position for air purging.

Referring now to FIG. 1, an air purge fuel valve 10 of the present invention includes a purge air inlet channel 12 leading to an air chamber 14 and a fuel inlet channel 16 leading to a fuel chamber 18. Both the air chamber 14 and the fuel chamber 18 extend along a spool axis 20 and are separated in opposition across an outlet chamber 22.

The outlet chamber 22 communicates with a fuel line 23 leading to the combustion chamber of the turbine. The purge air inlet channel 12 leads to a compressor stage of the turbine to provide a source of hot (400° Fahrenheit) air for purging the fuel valve 10. The fuel inlet channel 16 leads to a source of pressurized fuel typically from a fuel pump that may be separately activated when fuel is required for the turbine.

A first ring seal 24 separates the air chamber from the outlet chamber 22 and a second ring seal 26 separates the outlet chamber 22 from the fuel chamber 18. The ring seals are centered about the spool axis 20 and have identical internal diameters.

An elongated spool 28 has a generally cylindrical center section 30 equal in diameter to the internal diameter of the seals 24 and 26 so as to prevent flow through the seals 24 or 26 when the center section 30 is within either or both of the seals. The spool may move along the spool axis 20 and the center section 30 extends along the spool axis 20 by a distance greater than the separation between the seals 24 and 26 so that both seals may be blocked by the center section 30 and at no time is more than one seal 24 or 26 open.

On either side of the center section 30 along the spool axis 20, the spool 28 necks down to a narrower outside dimension and extends into the air chamber 14 and the fuel chamber 18, respectively. Flanged portions on either end of the spool 28 serve to guide the spool along the spool axis 20 within the chambers 14 and 18.

In air chamber 14, a helical compression spring 32 biases the spool 28 toward the fuel chamber 18 to close the seal 26 and to press the opposing end of the spool 28 against a stop formed by one end of a shaft 34 of an actuator piston 36, the shaft also lying along axis 20.

The actuator piston 36 may be activated by a source of compressed air through actuator air inlet 38 to move toward the spool along axis 20. The pressure of the air supplied through actuator air inlet 38 is sufficient, acting on the large area of the actuator piston 36, to move the spool toward the air chamber 14 so as to open seal 26 against the biasing force of spring 32 and any anticipated pressure of the purging air through purge air inlet channel 12 and against frictional forces caused by minor coking of the spool 28. The end of the spool 28 abutting the shaft 34 is not attached thereto, but rather the spool 28, in some circumstances to be described below, may move freely away from the shaft 34.

Referring still to FIG. 1, prior to pressurization of the fuel by the fuel pump to pass through fuel inlet channel 16 or after fuel pressure has stopped when it is desired to shut down the turbine, the spool 28 is biased fully toward the fuel chamber 18 blocking seal 26 to prevent fuel from reaching the fuel line 23. This biasing is by the spring 32, but also by the pressure exerted on the spool center section 30 by the purging air through purge air inlet channel 12. Thus, the valve 10 exhibits a positive shut off.

As noted, the width of the center section 30 of the spool is such that seal 26 must be completely blocked prior to seal 24 being opened preventing the possibility of heated combustion gases proceeding into the fuel chamber 18 to coke fuel and cause obstruction to the operation of the valve. Friction from small amounts of coking on the center section 30 are accommodated by the positive action of the spring and the pressurized purging air.

Referring now to FIG. 2, when it is desired to start the turbine, pressurized air is introduced through actuator air inlet 38 to move actuator piston 36 along axis 20 pushing the spool 28 backward against the pressure of the spring 32 and the purging air from the purge air inlet channel 12. The force provided by the actuator piston 36 is sufficient to overcome any slight amount of coking on the center section 30. The center section 30 moves sufficiently away from seal 26 to provide an extremely low pressure drop across the valve opening formed between the seal 26 and the center section 30.

Again, because of the length of the center section 30 of the spool 28, the fuel may not begin to flow until the purging air through seal 24 has been completely shut off.

Referring now to FIG. 3, the dimensions of the center section 30 of the spool 28 and the strength of the spring 32 are selected such that at typical pressures of the fuel through fuel inlet channel 16 and expected pressures of the purging air through purge air inlet channel 12, the spool 28 will remain in its right-most position without assistance from the shaft 34. Thus, failure of the air supply through actuator air inlet 38 will not cause a shutting down of the turbine so long as there is fuel pressure. Nevertheless, when fuel pressure is also lost, the spool will return to its right-most position sealing the seal 26 and providing an effective check valve against backflow into the fuel inlet channel 16. The freedom of the spool 28 to move without the influence of the shaft 34 allows it to provide both a check valve-type function and with the influence of shaft 34, a pneumatically actuated valve function in one unit.

The above description has been that of a preferred embodiment of the present invention. It will occur to those that practice the art that many modifications may be made without departing from the spirit and scope of the invention. In order to apprise the public of the various embodiments that may fall within the scope of the invention, the following claims are made.

I claim:

1. A purging fuel valve for a turbine engine having lines providing pressurized fuel, pressurized hot purge air from the engine, and having a fuel line leading to a combustion area of the engine, the valve comprising:

a first annular seal dividing an air chamber receiving the source of pressurized hot air from an outlet chamber communicating with the fuel line;

a second annular seal positioned in opposition along a spool axis from the first annular seal and dividing the outlet chamber from a fuel chamber receiving the source of pressurized fuel;

a spool extending along the spool axis to move therealong, the spool having a center section:
 (i) closing the first annular seal while allowing fuel flow through the second annular seal at a first position along the spool axis,
 (ii) closing the second annular seal while allowing hot purging air through the first annular seal at a second position along the spool axis,
 (iii) closing both the first and second annular seals at a third position between the first and second positions; whereby fuel coking of the outlet chamber is reduced.

2. The purging fuel valve of claim 1 including a stop within the fuel and air chambers and wherein the spool contacts a respective stop at the first and second positions to limit further motion of the spool and wherein the spool is freely movable in response to pressure on the spool from the hot purge air and pressurized fuel;

whereby the spool moves to close the fuel line or hot purge air line in the absence of pressure eliminating the need for check valves in the purge air and fuel lines.

3. The purging fuel valve of claim 1 including further a spring biasing the spool to the second position.

4. The purging fuel valve of claim 1 including further an actuator cylinder having a shaft extending along the spool axis from the fuel chamber to bias the spool toward the first position when the actuator cylinder is actuated.

5. The purging fuel valve of claim 4 wherein the actuator cylinder includes a spring biasing the shaft away from the spool when the actuator cylinder is not actuated.

* * * * *

UNITED STATES PATENT AND TRADEMARK OFFICE
CERTIFICATE OF CORRECTION

Patent No.   : 6,050,081
Dated        : April 18, 2000
Inventor(s)  : Harvey B. Jansen, et al.

It is certified that error appears in the above-identified patent and that said Letters Patent is hereby corrected as shown below:

add

Assignee:    Jansen's Aircraft Systems Controls, Inc., Tempe, Arizona

Signed and Sealed this

Twenty-fourth Day of April, 2001

Attest:

NICHOLAS P. GODICI

*Attesting Officer*    *Acting Director of the United States Patent and Trademark Office*